United States Patent
Yamada et al.

(10) Patent No.: US 11,256,950 B2
(45) Date of Patent: Feb. 22, 2022

(54) IMAGE FEATURE AMOUNT OUTPUT DEVICE, IMAGE RECOGNITION DEVICE, THE IMAGE FEATURE AMOUNT OUTPUT PROGRAM, AND IMAGE RECOGNITION PROGRAM

(71) Applicants: AISIN CORPORATION, Kariya (JP); KYUSHU INSTITUTE OF TECHNOLOGY, Kitakyushu (JP)

(72) Inventors: Hideo Yamada, Tokyo (JP); Kazuhiro Kuno, Tokyo (JP); Masatoshi Shibata, Tokyo (JP); Shuichi Enokida, Iizuka (JP); Hakaru Tamukoh, Kitakyushu (JP)

(73) Assignees: AISIN CORPORATION, Kariya (JP); KYUSHU INSTITUTE OF TECHNOLOGY, Kitakyushu (JP)

( * ) Notice: Subject to any disclaimer, the term of this patent is extended or adjusted under 35 U.S.C. 154(b) by 91 days.

(21) Appl. No.: 16/480,960

(22) PCT Filed: Jan. 31, 2018

(86) PCT No.: PCT/JP2018/003224
§ 371 (c)(1),
(2) Date: Jul. 25, 2019

(87) PCT Pub. No.: WO2018/143277
PCT Pub. Date: Aug. 9, 2018

(65) Prior Publication Data
US 2019/0392249 A1    Dec. 26, 2019

(30) Foreign Application Priority Data

Jan. 31, 2017 (JP) ............................ JP2017-016220

(51) Int. Cl.
*G06K 9/00* (2006.01)
*G06K 9/62* (2022.01)
(Continued)

(52) U.S. Cl.
CPC ......... *G06K 9/6212* (2013.01); *G06K 9/4647* (2013.01); *G06T 3/40* (2013.01)

(58) Field of Classification Search
None
See application file for complete search history.

(56) References Cited

FOREIGN PATENT DOCUMENTS

JP    2009-301104 A    12/2009
JP    2015-184944 A    10/2015

OTHER PUBLICATIONS

Iwata et al., Object Detection Based on Multiresolution CoHOG, International Symposium on Visual Computing ISVC 2014: Advances in Visual Computing pp. 427-443 (Year: 2014).*

(Continued)

*Primary Examiner* — Randolph I Chu
(74) *Attorney, Agent, or Firm* — Oliff PLC

(57) ABSTRACT

An image processing device converts an image that is a recognition object image to high-resolution, medium-resolution, and low-resolution images. The device sets the pixel of interest of the high-resolution image, and votes the co-occurrence in a gradient direction with offset pixels, the co-occurrence in the gradient direction pixels in the medium-resolution image, and the co-occurrence in the gradient direction pixels in the low-resolution image, to a co-occurrence matrix. The device creates such a co-occurrence matrix for each pixel combination and for each resolution. The device executes the process on each of the pixels of the high-resolution image, and creates a co-occurrence histogram wherein the elements of a plurality of co-occurrence matrices are arranged in a line. The device (Continued)

normalizes the co-occurrence histogram and extracts, as a feature quantity of the image, a vector quantity having as a component a frequency resulting from the normalization.

10 Claims, 10 Drawing Sheets

(51) Int. Cl.
*G06K 9/46* (2006.01)
*G06T 3/40* (2006.01)

(56) References Cited

OTHER PUBLICATIONS

Wata et al., "Object Detection Based on Multiresolution CoHOG," ISVC 2014, Part II, LNCS 8888, 2014, pp. 427-437.

Watanabe et al., "Co-occurrence Histograms of Oriented Gradients for Pedestrian Detection," PSIVT 2009, LNCS 6414, 2009, pp. 37-47.

Ambai et al., "Fast and Accurate Object Detection Based on Binary Co-occurrence Features," Information and Media Technologies, 2015, vol. 10, No. 3, pp. 464-467.

Aug. 7, 2020 Extended Search Report issued in European Patent Application No. 18748682.4.

Iwata et al., "Pedestrian detection based on gradient-orientation co-occurrences extracted using different filter sizes," The 21st Symposium on Sensing via Image Information, Jun. 2015, Yokohama, Japan.

Iwata et al., "Object Detection Based on Multiple Resolution CoHOG," The Journal of the Institute of Image Electronics Engineers of Japan, 2016, vol. 45, No. 1, pp. 42-52.

Apr. 24, 2018 International Search Report issued in International Patent Application No. PCT/JP2018/003224.

Aug. 6, 2019 International Preliminary Repod on Patentability issued in International Patent Application No. PCT/JP2018/003224.

\* cited by examiner

CO-OCCURRENCE HISTOGRAM

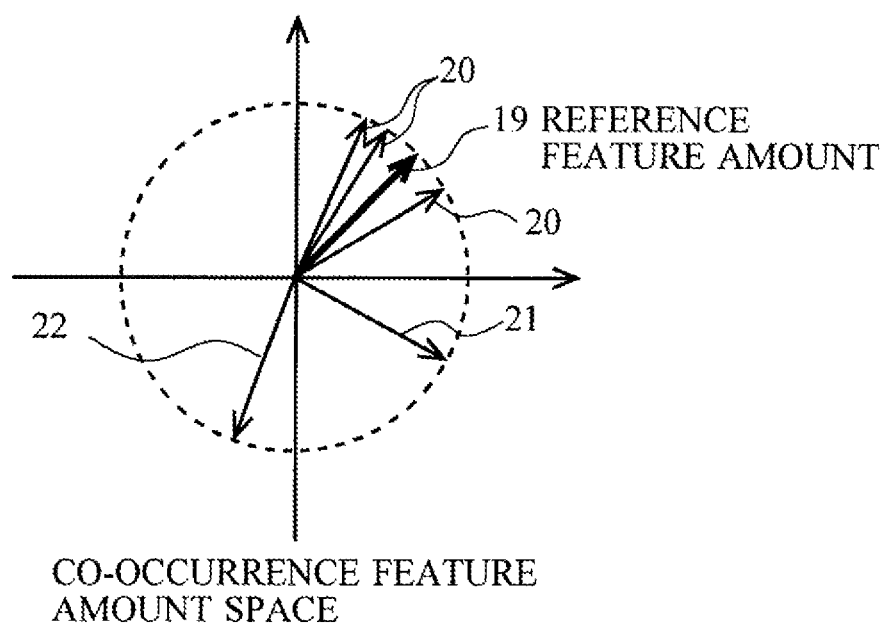

CO-OCCURRENCE HISTOGRAM

CO-OCCURRENCE HISTOGRAM

FIG.9(a)
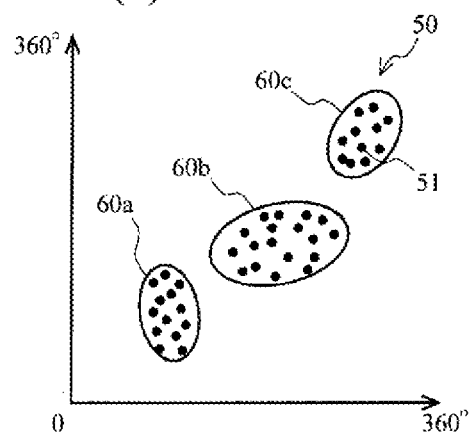
FIG.9(b)
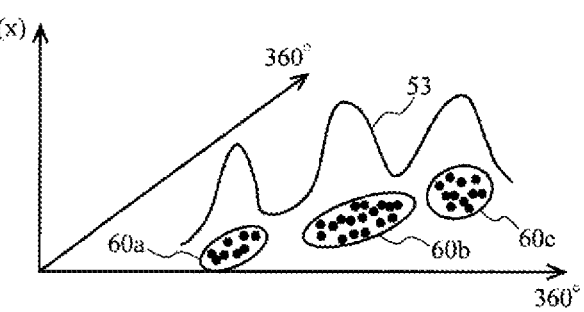
FIG.9(c)
$$p(x|\theta) = \sum_{j=1}^{K} p(x|z=j, \theta) = \sum_{j=1}^{K} \pi_j N(x|\mu_j, \Sigma_j)$$
FIG.9(d)
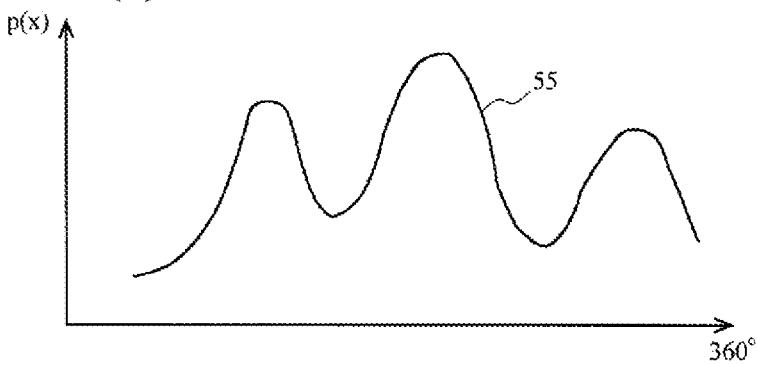
FIG.9(e)
$$\gamma(z_{kn}) = p(z=k|x_n) = \frac{\pi_k N(x_n|\mu_k, \Sigma_k)}{\sum_{j=1}^{K} \pi_j N(x_n|\mu_j, \Sigma_j)}$$

HOG FEATURE AMOUNT

IMAGE FEATURE AMOUNT OUTPUT DEVICE, IMAGE RECOGNITION DEVICE, THE IMAGE FEATURE AMOUNT OUTPUT PROGRAM, AND IMAGE RECOGNITION PROGRAM

TECHNICAL FIELD

The present invention relates to an image feature amount output device, an image recognition device, an image feature amount output program, and an image recognition program, and for example, relates to each which acquires a feature amount of a recognizing object from an image.

BACKGROUND ART

There has been an image recognition technology for recognizing an object by extracting a distribution in a gradient direction of luminance as image feature amount from an image, and comparing the extracted distribution with a distribution in the gradient direction of luminance of an image which is previously learned.

Histograms of Oriented Gradients (HOG) feature amount has been famous as an image feature amount according to the distribution in the gradient direction of the luminance.

FIG. 10 are drawings for explaining a concept of the HOG feature amount.

The HOG feature amount is extracted from an image by the following procedure.

An image 101 shown in a left drawing of FIG. 10(a) is assumed to be observation regions extracted by means of an observation window etc. for observing an object.

First, the image 101 is divided into rectangular cells 102a, 102b, . . . .

Then, as shown in a right drawing of FIG. 10(a), luminance gradient direction (directions from a low luminance to a high luminance) of each pixel (pixel) is quantized into, e.g., eight directions in accordance with each cell 102. It is to be noted that this quantization may be performed before being divided into the above-mentioned rectangular cells.

Subsequently, as shown in FIG. 10(b), the quantized directions of the luminance gradients are determined as bin (classes), and a histogram showing the number of occurrence as a frequency is produced, whereby the histogram 106 of the directions of the luminance gradients included in the cell 102 is produced in accordance with each cell 102.

Further, normalization is performed in such a manner that a total frequency of the histograms 106 becomes 1 in blocks each forming a group of several cells 102.

In the example shown in the left drawing of FIG. 10(a), the cells 102a, 102b, 102c, and 102d form one block.

A histogram in which the histograms 106a, 106b, . . . normalized in this manner are arranged in a line as shown in FIG. 10(c) becomes an HOG feature amount 107 of the image 101.

An image recognition device using the HOG feature amount compares a HOG feature amount of an image used as a reference and a HOG feature amount of an image which is a recognizing object and determines similarity degrees of both, thereby performing image recognition.

As a technology using such HOG feature amount, there has been a "person detection device" disclosed in Patent Literature 1. This technology detects a person shown on a surveillance camera by means of the HOG feature amount.

However, a more robust image recognition scheme has been required for a case of recognizing and tracking a person walking by an in-vehicle camera, for example.

CITATION LIST

Patent Literatures

Patent Literature 1: Japanese Patent Application Publication No. 2015-184944

DISCLOSURE OF INVENTION

Problem to be Solved by the Invention

The object of the present invention is to provide a more robust image recognition scheme.

SUMMARY OF THE INVENTION(S)

(1) The invention described in claim 1 provides an image feature amount output device comprising: an image input means for inputting an image; a resolution conversion means for converting a resolution of the input image; a gradient direction acquiring means for acquiring a luminance gradient directions of pixels included in the input image and the image obtained by converting the resolution; a pixel combination acquiring means for acquiring a combination of two pixels from the pixels included in the input image and the image obtained by converting the resolution; a co-occurrence acquiring means for acquiring a co-occurrence in the luminance gradient direction acquired by the gradient direction acquiring means with respect to the two pixels related to the acquired combination, using the acquired luminance gradient direction of each pixel; an occurrence frequency acquiring means for acquires distribution of an occurrence frequency of the co-occurrence acquired by the co-occurrence acquiring means while changing the combination of the pixel to be acquired in the pixel combination acquiring means; and an output means for outputting the distribution of the occurrence frequency of the co-occurrence acquired by the occurrence frequency acquiring means not including the distribution of the occurrence frequency with respect to the acquired luminance gradient direction, as a feature amount of the image.

(2) The invention described in claim 2 provides an image feature amount output device comprising: an image input means for inputs an image; a resolution conversion means for converting a resolution of the input image; a pixel combination acquiring means for acquiring a combination of two pixels from the pixels included in the input image and the image obtained by converting the resolution; a co-occurrence acquiring means for acquires the co-occurrence in luminance gradient directions of the two pixels related to the acquired combination; an occurrence frequency acquiring means for acquiring distribution of an occurrence frequency of the co-occurrence to be acquired while changing the acquired combination of the pixels; and an output means for outputting the acquired distribution of the occurrence frequency of the co-occurrence, as feature amount of the image.

(3) The invention described in claim 3 provides the image feature amount output device according to claim 1 or 2, wherein the pixel combination acquiring means acquires at least a combination of adjacent pixels over the whole image.

(4) The invention described in claim 4 provides the image feature amount output device according to claim 1, 2 or 3, wherein the pixel combination acquiring means acquires a combination of pixels having different resolutions.

(5) The invention described in claim 5 provides the image feature amount output device according to claim 1, 2 or 3, wherein the pixel combination acquiring means acquires a combination of pixels having the same resolution for each resolution.

(6) The invention described in claim 6 provides an image recognition device comprising: a reference feature amount acquiring means for acquiring a reference feature amount expressing a feature amount of a recognizing object with distribution of an occurrence frequency of co-occurrence in a luminance gradient direction; an object image acquiring means for acquiring an object image which is an object to be determined; an object image feature amount acquiring means for inputting the acquired object image into the image input means of the image feature amount output device according to claim 1 or 2, and for acquiring a feature amount of the aforementioned object image; a determination means for determining whether or not the object image includes a recognizing object image by comparing the acquired reference feature amount and the acquired feature amount of the object image; and a result outputting means for outputting a result of the determination.

(7) The invention described in claim 7 provides an image feature amount output program realizing functions by using a computer, the functions comprising: an image input function for inputting an image; a resolution conversion function for converting a resolution of the input image; a gradient direction acquiring function for acquiring a luminance gradient directions of pixels included in the input image and the image obtained by converting the resolution; a pixel combination acquiring function for acquiring a combination of two pixels from the pixels included in the input image and the image obtained by converting the resolution; a co-occurrence acquiring function for acquiring a co-occurrence in the luminance gradient direction acquired by the gradient direction acquiring function with respect to the two pixels related to the acquired combination, using the acquired luminance gradient direction of each pixel; an occurrence frequency acquiring function for acquires distribution of an occurrence frequency of the co-occurrence acquired by the co-occurrence acquiring function while changing the combination of the pixel to be acquired in the pixel combination acquiring function; and an output function for outputting the distribution of the occurrence frequency of the co-occurrence acquired by the occurrence frequency acquiring function not including the distribution of the occurrence frequency with respect to the acquired luminance gradient direction, as a feature amount of the image.

(8) The invention described in claim 8 provides an image recognition program realizing functions by using a computer, the functions comprising: a reference feature amount acquiring function for acquiring a reference feature amount expressing a feature amount of a recognizing object with distribution of an occurrence frequency of co-occurrence in a luminance gradient direction; an object image acquiring function for acquiring an object image which is an object to be determined; an object image feature amount acquiring function for inputting the acquired object image into the image input means of the image feature amount output device according to claim 1 or 2, or the image input function of the image feature amount output program according to claim 7, and for acquiring a feature amount of the aforementioned object image; a determination function for determining whether or not the object image includes a recognizing object image by comparing the acquired reference feature amount and the acquired feature amount of the object image; and a result outputting function for outputting a result of the determination.

Effect of the Invention(s)

According to the present invention, the more robust image recognition scheme can be provided by acquiring a feature amount by co-occurrence of a luminance gradient direction.

BRIEF DESCRIPTION OF DRAWINGS

FIG. 2 is a drawing for explaining image recognition processing executed by an image processing device.

FIG. 9 are drawings for explaining a third modified example.

Figure 1A:
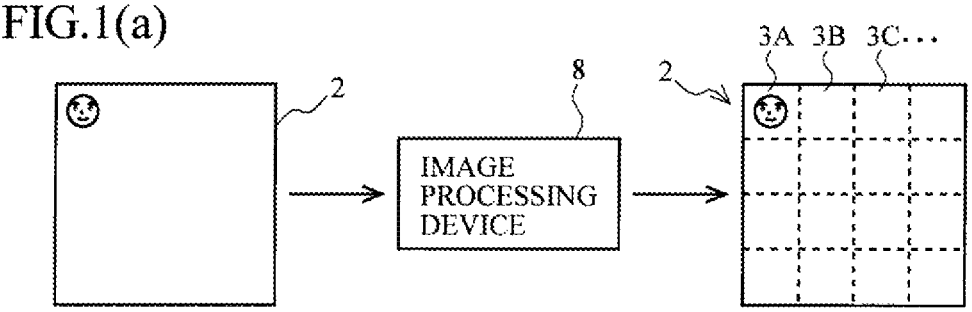
FIG. 1 are drawings for explaining image processing according to an embodiment.

BEST MODE(S) FOR CARRYING OUT THE INVENTION (1) Outline of Embodiment

An image processing device 8 (FIG. 1) of the present embodiment creates the co-occurrence matrix 15 on the basis of a co-occurrence relation in a luminance gradient direction of a pixel of interest 5 and its neighboring pixels, and uses this as a feature amount of a recognizing object image. This feature amount is a feature amount that uses information of a feature (luminance gradient direction) originally provided for each pixel of interest 5 included in the co-occurrence relation with the pixels 1a to 1d adjacent to the pixel of interest 5.

Specifically, the image processing device 8 converts an image that is a recognition object image to a high-resolution image 11, a medium-resolution image 12, and a low-resolution image 13. For the high-resolution image 11, it is also possible to use the original image as it is without conversion.

The image processing device 8 sets the pixel of interest 5 of the high-resolution image 11, and votes (counts) the co-occurrence in a gradient direction (luminance) with pixels 1a to 1d adjacent to the pixel of interest 5 in the high-resolution image 11, the co-occurrence in the gradient direction between the pixel of interest 5 and pixels 2a to 2d which are in a periphery thereof in the medium-resolution image 12, and the co-occurrence in the gradient direction between the pixel of interest 5 and pixels 3a to 3d which are in a periphery thereof in the low-resolution image 13, to a co-occurrence matrix 15.

The image processing device 8 creates such a co-occurrence matrix 15 for each pixel combination and for each resolution.

The image processing device 8 executes the above-described process on each of the pixels of the high-resolution image 11, and creates a co-occurrence histogram in which the elements of a plurality of co-occurrence matrices 15 completed as a result of the process are arranged in a line.

The image processing device 8 furthermore normalizes the co-occurrence histogram and extracts, as a feature quantity of the image, a vector quantity having as a component a frequency resulting from the normalization.

The image processing device 8 learns a large number of various images of a recognizing object (e.g., a pedestrian) according to the above-described method by means of the image processing, and extracts a reference feature amount that is a reference of the recognizing object.

Moreover, the image processing device 8 extracts a feature amount in accordance with the above-mentioned processing with respect to the image that is an image recognition object, and determines whether or not a recognizing object is shown on the aforementioned image on the basis of similarity between this extracted feature amount and the reference feature amount.

As mentioned above, since the image processing device 8 uses the combination of the gradient directions of pixels as the feature amount by co-occurrence of the luminance gradient direction, it can recognize the object more robustly than in the case of the HOG feature amount using distribution in the gradient direction of the single pixel as the feature amount.

(2) Details of Embodiment

FIG. 1 are drawings for explaining image processing according to the present embodiment.

The image processing device 8 of the present embodiment: is a device including both of a function as an image feature amount output device configured to extract a feature amount from an image and a function as an image recognition device configured to execute image recognition processing using this extracted feature amount; and is configured to extract the feature amount from the image by observing co-occurrence over between different resolutions of the same image.

As shown in FIG. 1(a), the image processing device 8 receives an input of an original image 2 which is an object of image processing, and divides this the original image 2 into a plurality of block regions 3A, 3B, . . . having the same rectangular shape.

In this manner, the image processing device 8 includes an image input means for inputting the images.

In the drawing, it is divided into 4×4 so as to be easily illustrated, but the standard value for dividing is 4×8, for example.

It is to be noted that if it is not necessary to in particular distinguish the block regions 3A, 3B, . . . , they are merely described as the block region 3.

Figure 1B:
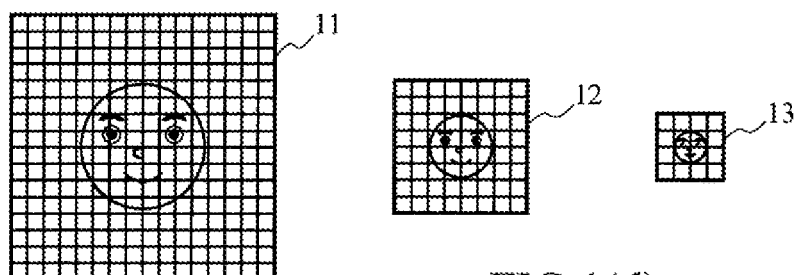

The image processing device 8 divides the original image 2 into the block region 3, converts a resolution of the original image 2, and generates a high-resolution image 11, a medium-resolution image 12, and a low-resolution image 13 respectively having different resolutions (different image sizes), as shown in FIG. 1(b). If the resolution of the original image 2 is suitable, the original image 2 is directly used as the high-resolution image 11.

In this manner, the image processing device 8 includes a resolution conversion means for converting the resolution of the image.

In the drawing, the high-resolution image 11, the medium-resolution image 12, and the low-resolution image 13 of the portion of the block region 3A are shown, and grids show an example of the pixels.

Then, the image processing device 8 calculates luminance gradient directions (directions from a low luminance to a high luminance) quantized in eight directions in every 45 degrees with respect to the respective pixels of the high-resolution image 11, the medium-resolution image 12, and the low-resolution image 13.

Hereinafter, the luminance gradient direction is merely described as a gradient direction. Moreover, the quantization in the eight directions is merely an example, and the number of the quantization directions may be m (where m=16, 32, or the like, for example).

After calculating the gradient direction in this manner, the image processing device 8 acquires co-occurrence in the gradient directions of a reference pixel (hereinafter, pixel of interest) and a pixel (hereinafter, offset pixel) located away from this, as follows.

Figure 1C:
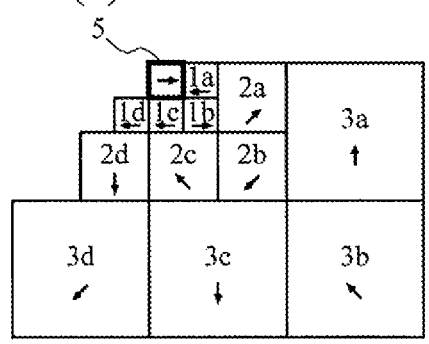

First, as shown in FIG. 1(c), the image processing device 8 sets a pixel of interest 5 to the high-resolution image 11, and attention is focused on offset pixels 1a to 1d which are at an offset distance 1 from the pixel of interest 5 in the high-resolution image 11(i.e., adjacent to in high resolution).

It is to be noted that the distance of n pixels is referred to as an offset distance n.

Figure 1D:
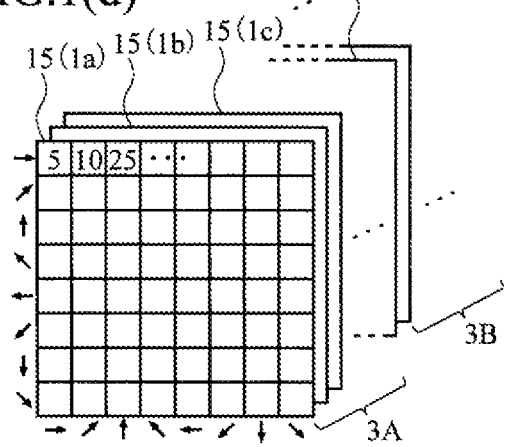

Then, the image processing device 8 acquires co-occurrence of the respective gradient directions (combination of the gradient directions) between the pixel of interest 5 and the offset pixels 1a to 3d, and votes it for a co-occurrence matrix 15 shown in FIG. 1(d).

FIG. 1(d) conceptually shows about the co-occurrence matrix. As shown in FIG. 1(d), the co-occurrence matrix 15 is composed of 12 co-occurrence matrixes 15 including the co-occurrence matrix 15 (1a) for the pixel of interest 5 and the offset pixel 1a, to the co-occurrence matrix 15 (3d) for the pixel of interest 5 and the offset pixels 3d.

It is to be noted that the 12 co-occurrence matrices 15 (1a) to 15 (3d) shown in FIG. 1(d) are created for each of the block regions 3A, 3B, . . . which are divided in FIG. 1(a).

Hereinafter, if indicating whole of the plurality of co-occurrence matrices, it is referred to as the co-occurrence matrix 15.

For example, in FIG. 1(c), if observing the co-occurrence relation between the pixel of interest 5 and the offset pixel 1a, the gradient direction of the pixel of interest 5 is rightward, and the gradient direction of the offset pixel 1a is leftward. Therefore, the image processing device 8 a vote is given for the element where a column of which gradient direction is the rightward and a line of which gradient direction is the leftward intersect, with respect to the co-occurrence matrix 15 (1a) for the offset pixels 1a.

Then, the image processing device 8 takes co-occurrence between the pixel of interest 5 and the offset pixel 1a and a vote is given for the co-occurrence matrix (1a), while moving the pixel of interest 5 one after another, in the high-resolution image 11.

In this manner, the co-occurrence matrix 15 expresses what frequency of occurrence of two gradient direction pairs having a specific offset (relative position from the pixel of interest 5) in the image.

In addition, the reason for observing the co-occurrence for the pixel on the right side of the pixel of interest 5 toward the drawing in FIG. 1(c) is to prevent acquisition of a combination of co-occurrence that overlaps with the movement of the pixel of interest, since it is set as a moving route of first moving the pixel of interest 5 from the pixel at an upper left end to the pixel in a right direction sequentially toward the drawing and moving it to the right from the pixel at a left end which is lower by one line when reaching the right end.

Moreover, although the movement of the pixel of interest 5 is executed in the block region 3A (inside of the same block region), the selection of the offset pixel is executed even when exceeding the block region 3A.

At the end portion of the original image 2, although the gradient direction cannot be calculated, this is processed by any appropriate method.

Then, the image processing device 8 acquires the co-occurrence in the gradient direction between the pixel of interest 5 and the offset pixel 1b (refer to FIG. 1(c)), and votes for the co-occurrence matrix 15 (1b) (counts up the number of the co-occurrences in the same gradient direction).

The image processing device 8 prepares new co-occurrence matrix 15 (1b) which is different from the co-occurrence matrix 15 previously used for the pixel of interest 5 and the offset pixel 1a, and a vote is given for this. In this manner, the image processing device 8 generates the co-occurrence matrix 15 for every combination of the relative positional relationships between the pixel of interest 5 and the offset pixel.

Then, the image processing device 8 takes co-occurrence between the pixel of interest 5 and the offset pixel 1b and a vote is given for the co-occurrence matrix 15 (1b), while moving the pixel of interest 5 one after another, in the high-resolution image 11.

Hereinafter similarly, the image processing device 8 prepares individual co-occurrence matrices 15 (1c) and 15 (1d) respectively for a combination between the pixel of interest 5 and the offset pixel 1c and a combination between the pixel of interest 5 and the offset pixel 1d, and a vote is given for the co-occurrence in the gradient directions.

In this manner, the image processing device 8 generates the four co-occurrence matrices 15 with respect to the pixel of interest 5 and the offset pixels 1a to 1d at the offset distance 1 from the pixel of interest 5, and then attention is focused on the pixel of interest 5 in the high-resolution image 11 and offset pixels 2a to 2d in the medium-resolution image 12 at the offset distance 2.

Then, the co-occurrence matrix 15 (2a) according to the combination of the pixel of interest 5 and the offset pixel 2a is created, and the co-occurrence matrices 15 (2b), 15 (2c), . . . according to the combination of the offset pixels 2b, 2c, and 2d are created by the same method, as the above-mentioned method.

Then, the image processing device 8 generates the co-occurrence matrices 15 (3a), 15 (3b), . . . for respective combinations of relative positional relationships between the pixel of interest 5 and the offset pixels 3a to 3d, with respect of the pixel of interest 5 in the high-resolution image 11 and the offset pixels 3a to 3d of the low-resolution image 13 at the offset distance 3, in the same manner.

The image processing device 8 applied the above-mentioned processing also to the block regions 3B, 3C, . . . , and generates a plurality of co-occurrence matrices 15 obtained by extracting a feature of the original image 2.

In this manner, the image processing devices 8 generates a plurality of the co-occurrence matrices 15 (1a) to 15 (3d) respectively for the block regions 3A, 3B, 3C . . . .

The image processing device 8 includes a pixel combination acquiring means for acquiring the combination of the two pixels from the pixels included in the input image and the image obtained by converting the resolution, and a co-occurrence acquiring means for acquires the co-occurrence in the luminance gradient directions of the two pixels related to the aforementioned combination.

Moreover, the aforementioned pixel combination acquiring means includes an occurrence frequency acquiring means for acquiring at least a combination of the adjacent pixels over the whole image, and acquiring distribution of an occurrence frequency of co-occurrence in the gradient directions, changing the combination of the aforementioned pixels.

Furthermore, the pixel combination acquiring means sets the pixels obtained by converting the resolution as an object of the combination and acquires the combination of the pixels having the different resolution.

Figure 1E:

After the image processing device 8 generates the plurality of co-occurrence matrices 15 from the original image 2 in this manner, the image processing device 8 arranges these components in the line to form a co-occurrence histogram 18, as shown in FIG. 1(e).

The co-occurrence histogram 18 includes the feature amount of the original image 2 in accordance with the co-occurrence in the gradient directions, and the image processing device 8 normalizes the total frequency of the frequencies in the histogram so as to be 1.

Then, the image processing device 8 outputs a vector quantity applying the frequency of the normalized co-occurrence histogram 18 as a component, as the co-occurrence feature amount of the original image 2.

The co-occurrence feature amount expresses the occurrence frequency of co-occurrence in the gradient directions, and thus the image processing device 8 includes an output means for outputting the distribution of the occurrence frequency of co-occurrence as the feature amount of the image.

As an example, when the block count is 4×8, the resolution of the medium-resolution image 12 is ½ of the high-resolution image 11 and the resolution of the low-resolution image 13 is ¼ of the high-resolution image 11, the feature amount according to the co-occurrence in the high-resolution image 11 is (8×8×4)×4×8=8192, the feature amount according to the co-occurrence between the high-resolution image 11 and the medium-resolution image 12 is (8×8×4)× 2×4=2048, and the feature amount according to the co-occurrence between the high-resolution image 11 and the low-resolution image 13 is (8×8×4)×1×2=512, and therefore the total feature amount is 10752.

Here, the value (8×8×4) is a value in which 8×8 which is the number of the elements of the co-occurrence matrix 15 is multiplied by the number of offset pixels 4 to be combined with the pixel of interest 5.

Moreover, the values 4×8, 2×4, 1×2 are respectively the numbers of the blocks of the high-resolution image 11, the medium-resolution image 12, and the low-resolution image 13.

Thus, the output means outputs only the distribution of the co-occurrence in the gradient directions, for example, and therefore does not include the feature amount according to the distribution in the luminance gradient directions of the pixels defined by the HOG feature amount in the conventional example.

The above-mentioned explanation is an explanation of the concept of the method of extracting the co-occurrence feature amount, and the image processing device 8 can be configured so that the pixels of these resolutions are dynamically generated one after another in the course of acquiring the co-occurrence in the gradient directions of the offset pixels at the periphery of the pixel of interest 5.

This procedure is suitable for realizing by dedicated hardware for processing image data of the original image 2 to be input in parallel with the input, and outputting the co-occurrence feature amount.

Moreover, since the co-occurrence feature amount can be extracted at high speed when the image processing device mounts the aforementioned hardware, it also becomes possible to detect a pedestrian from the co-occurrence feature amount of a moving image frame output from an in-vehicle camera in real time, for example.

FIG. 2 is a drawing for explaining image recognition processing executed by the image processing device 8.

Although the image processing device 8 includes the feature amount extract function for extracting the co-occurrence feature amount from the original image 2 as mentioned above then, it will now explain the image recognition function using this feature amount extract function.

First, the image processing device 8 processes a large amount of images on which the recognizing object (hereinafter, assumed as the pedestrian, as an example) is shown in various aspects by means of the above-mentioned method, and learns the co-occurrence feature amount of the images on which the pedestrian was shown. This learned feature amount is called a reference feature amount.

The learning is generated by overlaying voting so that the co-occurrence according to the next original image 2 is superimposed and voted for example, for the co-occurrence matrices 15, 15, . . . which are completed by voting for the initial original image 2.

The reference feature amount includes a feature based on the gradient directions peculiar to the pedestrian shown on the image, and is a unit vector oriented to a direction which is a co-occurrence feature quantity space. This is assumed to a reference feature amount vector (reference feature amount) 19.

In the drawing, the co-occurrence feature space is expressed in two dimensions for simplicity, but if there are n number of bins of the co-occurrence histogram 18, it is n dimension. In the example explained above, it is 10752 dimensions.

In this manner, after the image processing device 8 previously learns the pedestrian's image and prepares the reference feature amount, the image processing device 8 acquires a recognizing object image which is an image recognition object, and extracts the co-occurrence feature amount from the aforementioned recognizing object image.

This also becomes the unit vector in the co-occurrence feature quantity space, and uses this as co-occurrence feature amount vectors 20, 21, and 22.

As described above, the image processing device 8 includes a reference feature amount acquiring means for acquiring the reference feature amount which expresses the feature amount of the recognizing object with the distribution of the occurrence frequency of co-occurrence in the luminance gradient.

When the learned image and the recognizing object image are similar to each other, that is, when a pedestrian is included in the recognizing object image, the co-occurrence feature amount vector is oriented to a direction close to the reference feature amount vector 19, as the co-occurrence feature amount vector 20.

On the other hand, when no pedestrian is included in the recognizing object image, the co-occurrence feature amount vector of the aforementioned recognizing object image is oriented to a direction which is different from the reference feature amount vector 19, as the co-occurrence feature amount vectors 21, 22.

Therefore, the inner product of the reference feature amount vector 19 and the co-occurrence feature amount vector extracted from the recognizing object image makes it possible to numerically express the similarity between the learned image and the recognizing object image, and it becomes a value closer to 1 as both become similar to each other.

Then, for example, when this inner product is higher than a predetermined threshold value, the image processing device 8 determines that the pedestrian is shown on the recognizing object image, and outputs a determination result thereof.

As described above, the image processing device 8 includes a determination means for determining and outputting the similarity between the learned image and the recognizing object by comparing the feature amount of the recognizing object image with the reference feature amount.

Figure 3:
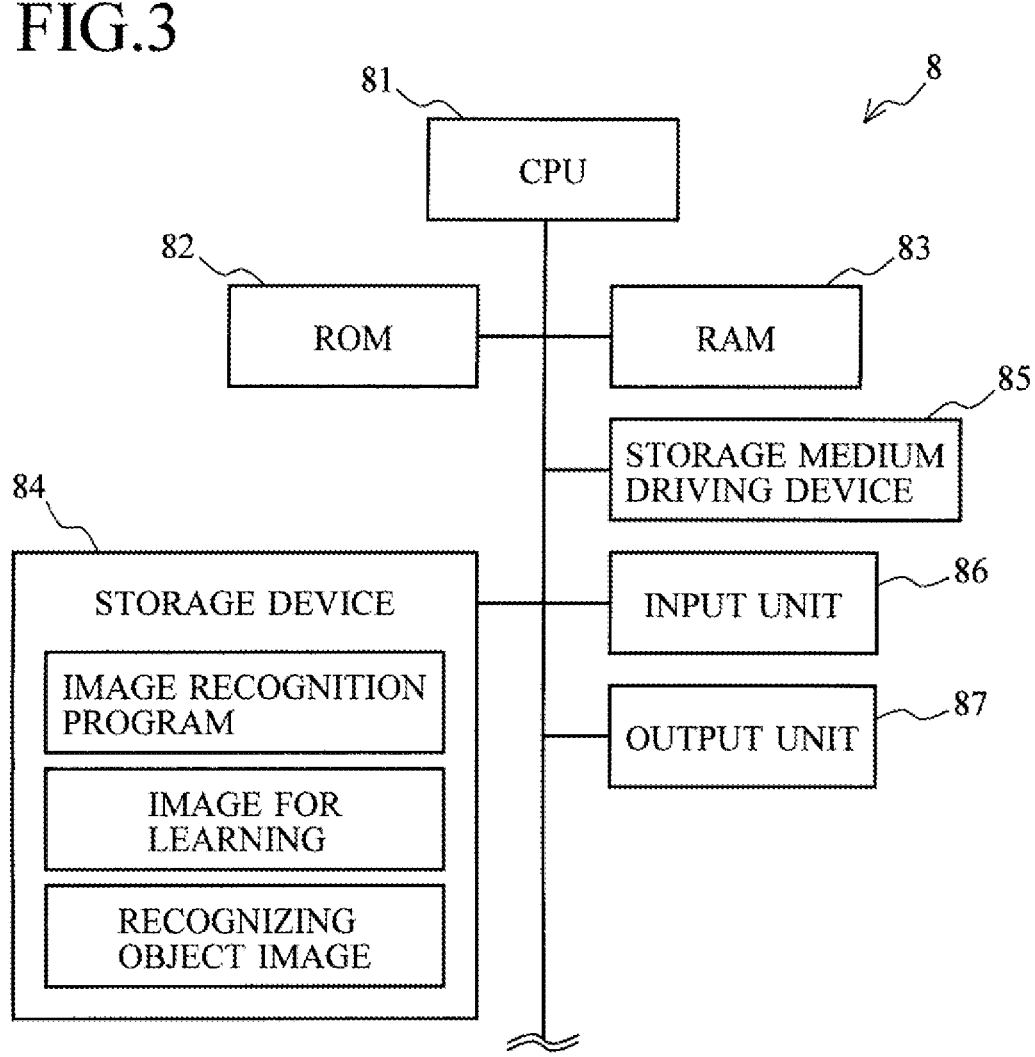
FIG. 3 is a drawing showing an example of a hardware configuration of the image processing device.

FIG. 3 is a drawing showing an example of a hardware configuration of the image processing device 8.

The image processing device 8 is configured to include a personal computer, for example.

This is merely an example, and dedicated hardware for extracting the co-occurrence feature amount formed of a semiconductor device may be mounted in an in-vehicle camera.

The image processing device 8 is configures by connecting a CPU 81, a ROM 82, a RAM 83, a storage device 84, a storage medium driving device 85, an input unit 86, an output unit 87, and the like through a bus line.

The CPU 81 is a central processing unit, operates in accordance with an image recognition program stored in the storage device 84, and executes the above-mentioned feature amount extracting processing from the image, the above-mentioned image recognition processing using the extracted co-occurrence feature amount, and the like.

The ROM 82 is a read-only memory and stores a basic program and parameters for operating the CPU 81.

The RAM 83 is a memory capable of reading and writing and provides a working memory at the time when the CPU 81 executes the feature amount extracting processing and the image recognition processing.

The storage device 84 is configured using a large-capacity storage medium, e.g. a hard disk, and is configured to store an image recognition program, images for learning, image data of recognizing object images, and the like.

The image recognition program is a program that causes the CPU 81 to exhibit the feature amount extracting processing function and the image recognition processing function.

The storage medium driving device 85 is a device for driving external storage media, e.g. a semiconductor memory device and a hard disk, for example.

Consequently, the image for learning and the recognizing object image can be read.

The input unit 86 includes input devices for receiving an input from an operator, e.g. a keyboard and a mouse, and is configured to read various kinds of programs and data and to receive an operation from the operator.

The output unit 87 includes output devices for presenting various information, e.g. a display and a printer, to the operator, and is configured to output an operation screen for the image recognition program and results of the feature amount extracting processing and the image recognition processing.

In addition, the image processing device 8 includes a communication control unit for being connected to a communication network and an interface for connecting an external device, and the like.

The image processing device 8 can receive moving images from a camera connected to the communication network or the interface, and can also execute the image recognition processing in real time with respect to the receives moving images.

Figure 4:
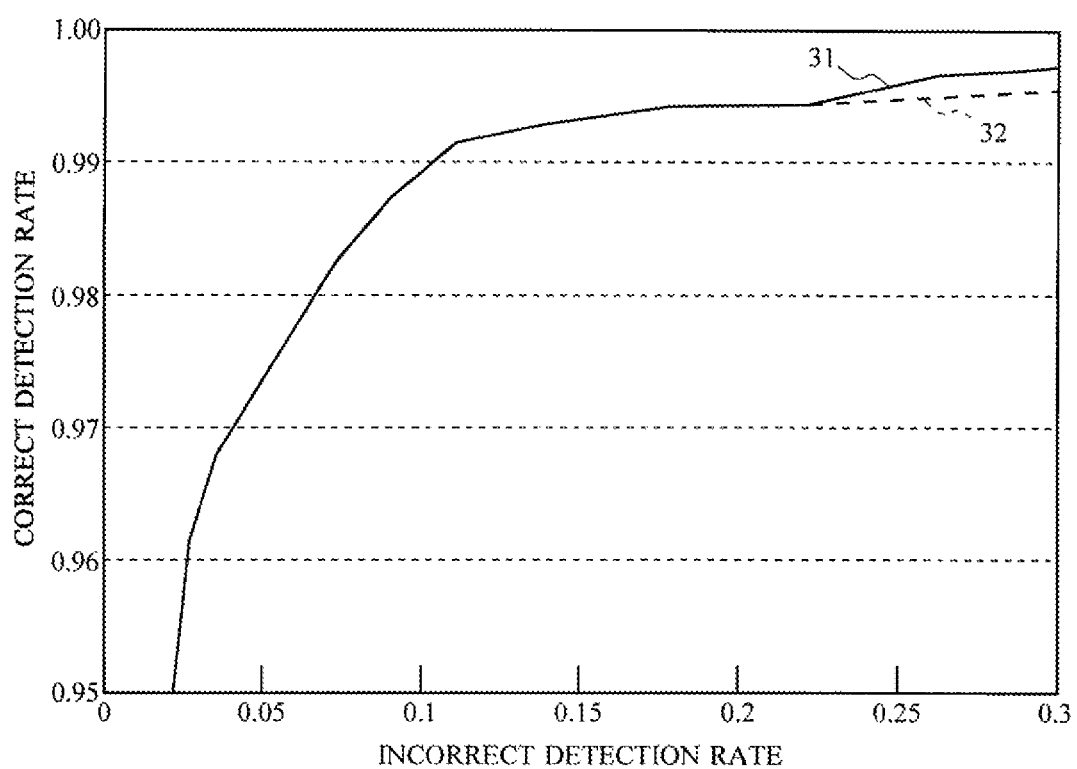
FIG. 4 is a drawing showing experimental data for verifying the image recognition ability using a co-occurrence feature amount.

FIG. 4 is a drawing showing experimental data for verifying the image recognition ability using a co-occurrence feature amount.

The axis of ordinate of the graphic chart indicates a correct detection rate, and the axis of abscissa indicates an incorrect detection rate.

The curve 31 expressed as the solid line shows a case where the image recognition is executed with a feature amount obtained by adding a HOG feature amount to a co-occurrence feature amount including co-occurrence between multiple resolutions (between multiplex resolutions) acquired by means of the described method, and the curve 32 expressed as the wavy line shows a case where the image recognition is executed with a feature amount obtained by using only the aforementioned co-occurrence feature amount.

Thus, comparing the case where the HOG feature amount is added to the co-occurrence feature amount and the case of only the co-occurrence feature amount is to confirm whether the image recognition ability further improves by adding the HOG feature amount to the co-occurrence feature amount, since the image recognition ability only using the co-occurrence feature amount including the co-occurrence between multiple resolutions was more satisfactory than the image recognition ability only using the HOG feature amount.

Consequently, as shown in FIG. 4, both are almost the same until incorrect detection rate exceeding around 0.2, and, for that reason, the curve 31 and the curve 32 overlap each other in this region.

The correct detection rate of the curve 32 becomes slightly smaller than the correct detection rate of the curve 31 as the correct detection rate approaches 1.0. However, the difference therebetween is small, and it is proved that the image recognition ability hardly changes even if adding the HOG feature amount to the co-occurrence feature amount including the co-occurrence between the multiple resolutions.

By the way, in this graph, the larger the area under the curve, the higher the ability.

Thus, a reason the satisfactory result is obtained only using the co-occurrence feature amount including the co-occurrence between the multiple resolutions without requiring the reinforcement by the HOG feature amount is assumed as follows.

That is, when calculating the co-occurrence histogram in the gradient directions, since the luminance value is displaced by only a very small amount, many adjacent pixels having the same gradient directions. Therefore, a co-occurrence pair in a local domain has includes the HOG feature amount which is a histogram of the pixel of interest itself, and the HOG feature amount is redundant information.

Moreover, the following reason is estimated as another viewpoint with regard to no reinforcement by the HOG feature amount being necessary.

Figure 10A:
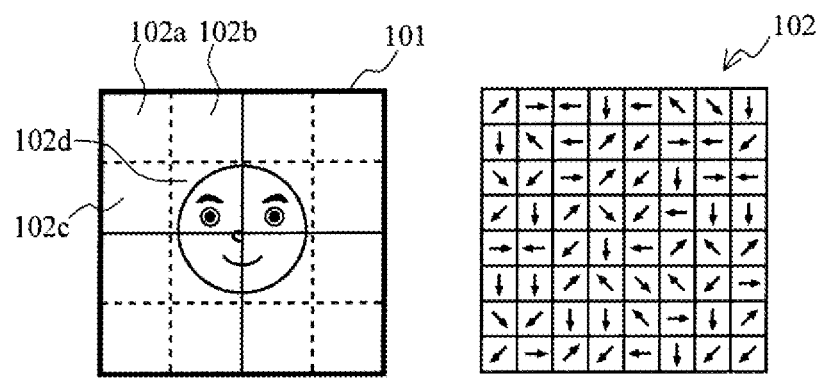
FIG. 10 are drawings for explaining a conventional example.
Figure 10B:
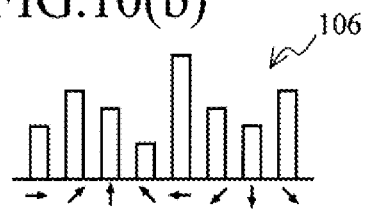
Figure 10C:

That is, in the co-occurrence matrix 15 shown in FIG. 1(*d*), by setting the column as the gradient direction of the pixel of interest 5 and the line as the gradient direction of the offset pixel, the gradient directions of the pixel of interest 5 and the offset pixel are represented with two dimensions. If all the values of the elements for each line are added to all the lines in this co-occurrence matrix 15 to be represented in one dimension, a histogram in the luminance gradient directions can be generated similar to FIG. 10(*b*).

For example, in the co-occurrence matrix 15, the number of occurrences of the pixel of interest 5 of which the gradient direction is in the right direction is obtained by adding all the elements for the column of which the gradient direction is in the right direction.

Thus, it is estimated that it is the reason that information corresponding to the HOG feature amount has already been included in the co-occurrence matrix 15 of the present embodiment.

As described above, since the image recognition can be realized only with the co-occurrence feature amount, without reinforcement by the HOG feature amount, the feature amount expressing the object can be efficiently calculated, the processing speed can also be improved by not calculating the HOG feature amount, and the circuit scale can also be reduced in a case of being mounted in hardware.

Figure 5:
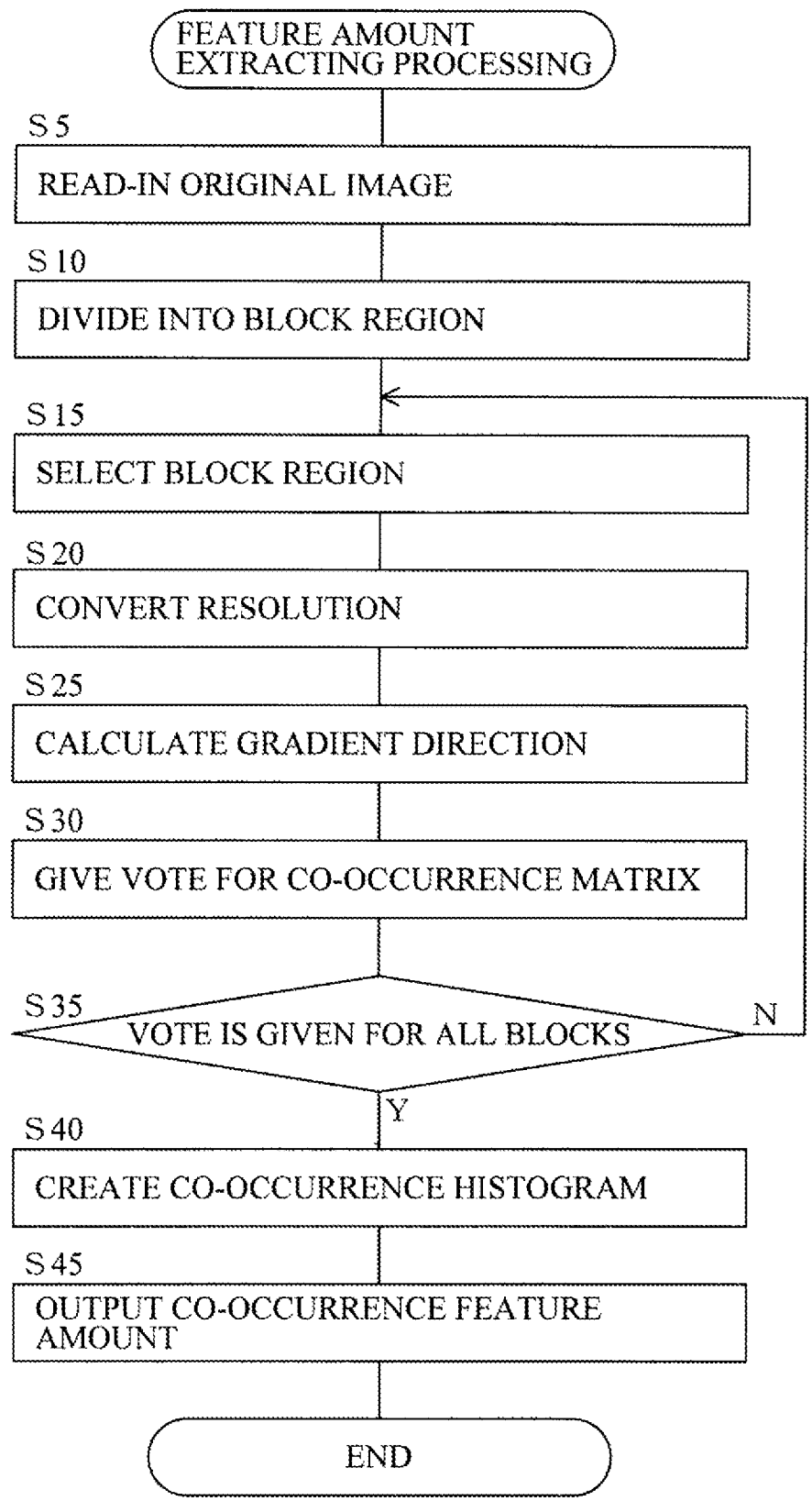
FIG. 5 is a flow chart for explaining a procedure of feature amount extracting processing.

FIG. 5 is a flow chart for explaining a procedure of feature amount extracting processing.

The following processing is executed by the CPU 81 in accordance with the image recognition program.

First, the image processing device 8 receives an input of an original image 2 which is an object for extracting a feature from the storage device 84 or the like, and reads it into the RAM 83 (Step 5).

Then, the image processing device 8 divides the original image 2 into block regions 3, and stores division positions thereof to the RAM 83 (Step 10).

Then, the image processing device 8 selects one of the divided block regions 3 of the high-resolution image 11 (Step 15), and generates pixels of the high-resolution image 11, pixels of the medium-resolution image 12, and pixels of the low-resolution image 13 for co-occurrence from the selected block region, and stores them in the RAM (Step 20).

It is to be noted that when using the original image 2 as it is as the high-resolution image 11, the pixels of the original image 2 are used as the pixels of the high-resolution image 11 without performing resolution conversion thereof.

Then, the image processing device 8 calculates gradient directions for the respective generated pixels of the high-resolution image 11, the medium-resolution image 12, and the low-resolution image 13, and stores them to the RAM 83 (Step 25).

Then, the image processing device 8 co-occurs in the gradient directions, in the high-resolution image 11, between the high-resolution image 11 and the medium-resolution image 12, and between the high-resolution image 11 and the low-resolution image 13, and a vote is given for the co-occurrence matrix 15 and stored it in the RAM 83 (step 30). Consequently, the co-occurrence matrices 15, 15, . . . in accordance with the aforementioned block region 3A are obtained.

Then, image processing device 8 determines whether or not the vote has been given for all the block regions 3 (Step 35).

If there is still a block region 3 for which a vote is not given (Step 35; N), the image processing device 8 returns to Step 15 to select the next block region 3, and gives a vote for this selected block region 3.

On the other hand, when the vote is given for all the block regions 3 (Step 35; Y), the image processing device 8 creates a co-occurrence histogram 18 of the original image to which the histogram of all the block regions 3 is connected, from an array of the RAM 83 (Step 40).

Then, the image processing device 8 normalizes the aforementioned histogram and outputs a vector quantity using the frequency of each bin as a component to the RAM as the co-occurrence feature amount of the original image 2 (Step 45).

As mentioned above, the image processing device 8 can extract the co-occurrence feature amount from the original image 2, outputs reference feature amount if many learning images are input and learned as the original image 2, and outputs the co-occurrence feature amount for performing the image recognition of the aforementioned recognition image if the recognizing object image is input.

Figure 6:
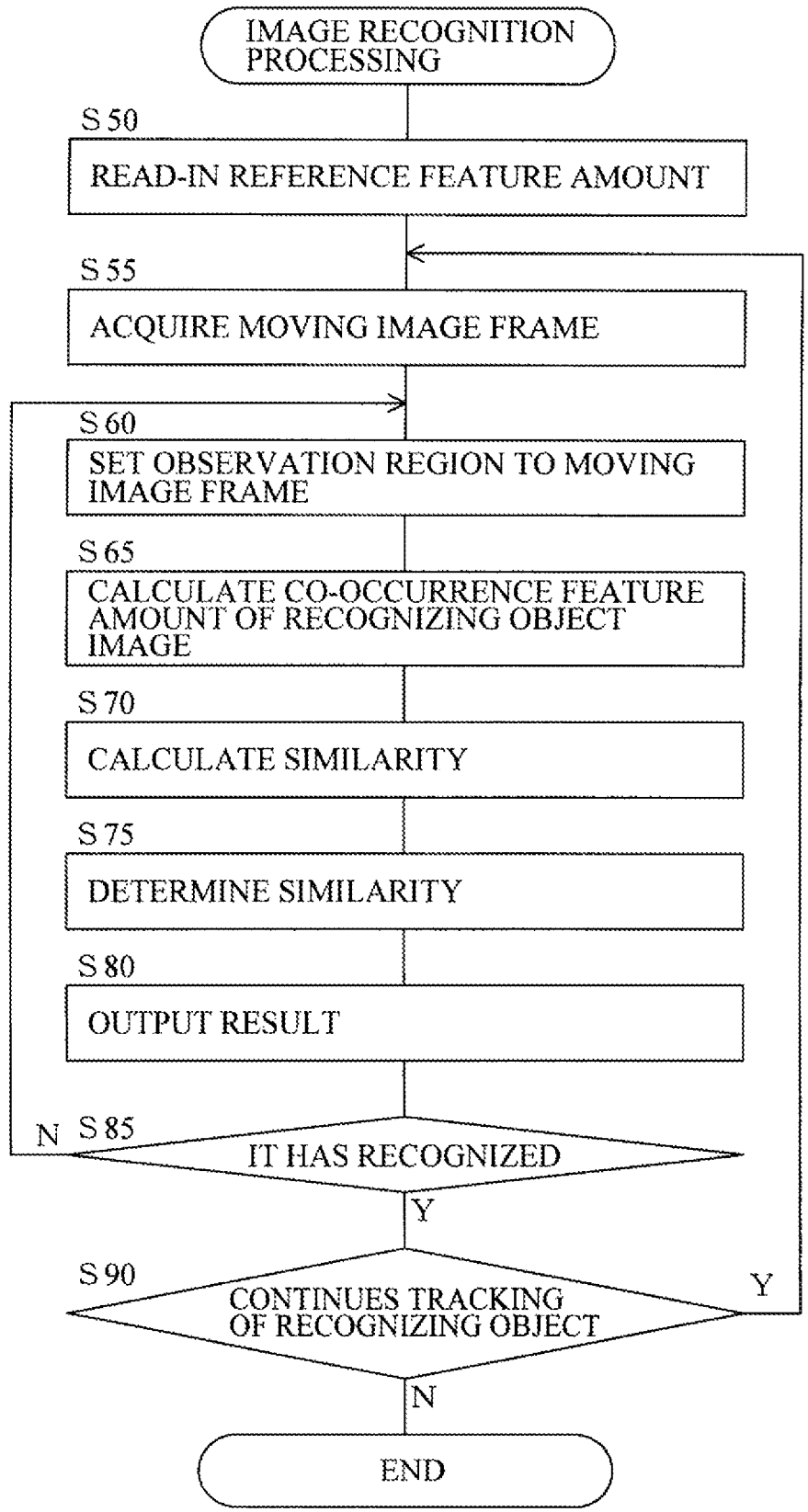
FIG. 6 is a flow chart for explaining a procedure of image recognition processing.

FIG. 6 is a flow chart for explaining a procedure of image recognition processing.

Here, a case of tracking a pedestrian by means of an in-vehicle camera will now be explained as an example.

The image processing device 8 is mounted in a vehicle, and is connected to the camera of which outside is a photographic object (forward direction of the vehicle, for example).

The vehicle tracks the pedestrian with the image processing device 8, and outputs this to a control system of the vehicle, and the control system assists a driver's handle operation, brake operation, and the like on the basis of this, and thereby safety is improved.

First, the image processing device 8 reads the reference feature amount which learns the recognizing object (in this case, the pedestrian) from the storage device 84 or the like into the RAM 83. (Step 50).

Then, the image processing device 8 acquires a moving image frame from the video data transmitted from the camera, and stores it in the RAM 83 (Step 55).

Then, the image processing device 8 sets a rectangular observation region (image of interest region) for detecting the pedestrian, in the moving image frame stored in the RAM 83 (Step 60).

In first-time pedestrian detection, since there it is not known where the pedestrian is shown, the image processing device 8 generates a random number (particles) with a white noise on the basis of the appropriate initial value, for example, and sets the observation region having an appropriate size at an appropriate position on the basis of this.

The image processing device 8 stores in the RAM 83 an image included in the aforementioned observation region as the recognizing object image.

Then, the image processing device 8 calculates the co-occurrence feature amount of the recognizing object image through the feature amount extracting processing, and stores it in the RAM 83 (Step 65).

Then, the image processing device 8 reads the reference feature amount and the co-occurrence feature amount of the recognizing object image which are stored in the RAM 83, and calculates similarity by calculating the inner product in the co-occurrence feature quantity space, and stores it in the RAM 83 (Step 70).

This calculation of the similarity can be input into a discriminator, e.g. a support vector machine (SVM) and an AdaBoost, and can be used for determination of the image recognition, for example. It is to be noted that this does not limit the discriminator and a user can freely select it from the balance of calculation cost or accuracy.

Then, the image processing device 8 determines the similarity of whether the recognizing object image is similar to the pedestrian by determining whether the similarity stored in the RAM 83 satisfies the predetermined conditions (e.g., whether it has reached a predetermined threshold) (Step 75), and then outputs this to the RAM 83 (Step 80).

When not similar, the image processing device 8 determines that the pedestrian has not recognized in the aforementioned observation region in the moving image frame (Step 85; N), and returns to Step 60 and also sets an observation region which is different from previous observation region in the moving image frame, and then repeats the recognition of the pedestrian.

When it is similar, the image processing device 8 determines that the pedestrian has recognized in the aforementioned observation region in the moving image frame (Step 85; Y), and outputs a recognized result to the control system in the vehicle.

Then, the image processing device 8 determines further whether it should continue the tracking of the recognizing object (Step 90). In this determination, for example, it is determined that tracking should not continue when the vehicle stops traveling by arriving at a destination, etc., and it is determined that tracking should continue when the vehicle is traveling.

When it is determined that it does not continue the tracking (Step 90; N), the image processing device 8 completes the image recognition processing.

On the other hand, when it is determined that it should continue the tracking (Step 90; Y), the image processing device 8 returns to Step 55 to execute the similar image recognition processing with respect to the next moving image frame.

It is to be noted that in the second and subsequent image recognition, the image processing device 8 sets the observation region to the vicinity of the pedestrian being detected in the previous image recognition in Step 60.

This is because it is considered that the present moving image frame is present in the vicinity where the pedestrian is detected in the previous moving image frame.

It is effective for this to use a method of a particle filter for generating a random number (particles) which constitutes the normal distribution centering on the observation region where the pedestrian is previously detected, for example, generating an observation region one after another in correspondence with the aforementioned random number, and searching the observation region where the similarity is the highest.

As mentioned above, the image processing device 8 can detect the pedestrian from the image out of the vehicle captured by the in-vehicle camera and can track this pedestrian.

This method is applicable to a surveillance camera and a system for tracking another object which is moving on the basis of a moving image, in addition to the in-vehicle camera.

Although the recognizing object is the pedestrian as an example, it is also possible to apply to automatic driving for recognizing while traveling white lines on a road, traffic lights, road signs, and the like, for example.

It is also possible to track a vehicle which travels ahead in accordance with the image recognition, and to apply to so-called convoy traveling following this tracking.

In the embodiment described above, images of three resolutions for the same photographic object are prepared, and the co-occurrence in the gradient directions up to the offset distance 1 to 3 is acquired, but the present invention is not limited to this example. Images of two resolutions or four or more resolutions can be combined if the necessary image recognition accuracy can be obtained.

FIG. 7 are drawings for explaining a first modified example.

Figure 7A:
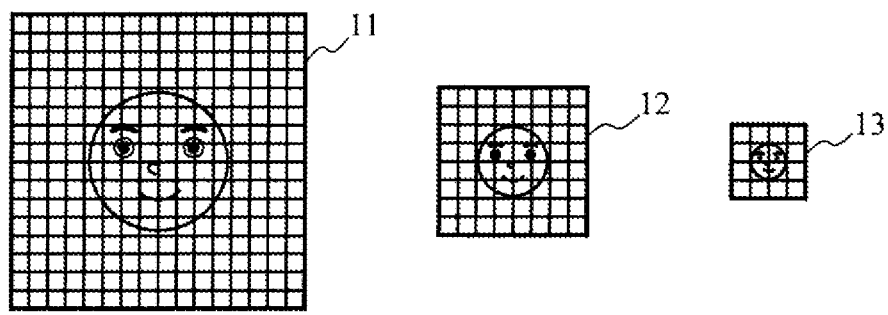
FIG. 7 are drawings for explaining a first modified example.

As shown in FIG. 7(a), the image processing device 8 according to this modified example is configured to form the high-resolution image 11, the medium-resolution image 12, and the low-resolution image 13, in the same manner as the image processing device 8 of the previously explained embodiment.

Then, the image processing device 8 calculates the gradient direction of each pixel for each image having different resolution, and observes co-occurrence in the gradient direction within a range of each resolution.

Figure 7B:
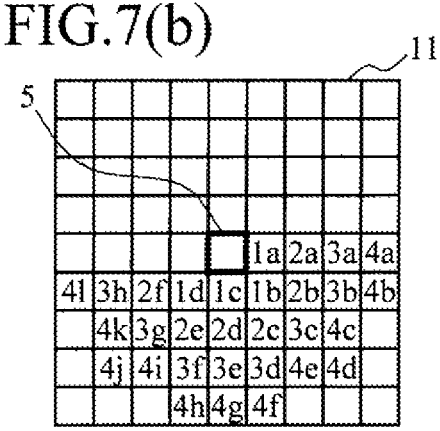

FIG. 7(b) is a drawing for explaining acquiring of the co-occurrence in the high-resolution image 11.

The image processing device 8 sets a pixel of interest 5 with respect to the high-resolution image 11, acquires the co-occurrence in the gradient directions with the pixel of interest 5 for offset pixels 1a to 1d (i.e., adjacent of the pixel of interest 5) at the offset distance 1, and a vote is given for the co-occurrence matrix 15 of the combination between the pixel of interest 5 and the offset pixel 1a, the co-occurrence matrix 15 of the combination between the pixel of interest 5 and the offset pixel 1b, . . . .

Then, the image processing device 8a acquires the co-occurrence of gradient directions with the pixel of interest 5 from the pixel of interest 5 for the offset pixels 2a to 2f at the offset distance 2, and gives a vote for the co-occurrence matrix 15 for each combination.

Furthermore, the image processing device 8a acquires the co-occurrence in the gradient directions with the pixel of interest 5 from the pixel of interest 5 also for the offset pixels 3a to 3h at the offset distance 3 and the offset pixels 4a to 4l of the pixel of interest 5 at the offset distance 4, and gives a vote for the co-occurrence matrix 15 for each combination.

The image processing device 8 executes the above-mentioned processing for all pixels, moving the pixel of interest 5 in the high-resolution image 11.

Figure 7C:
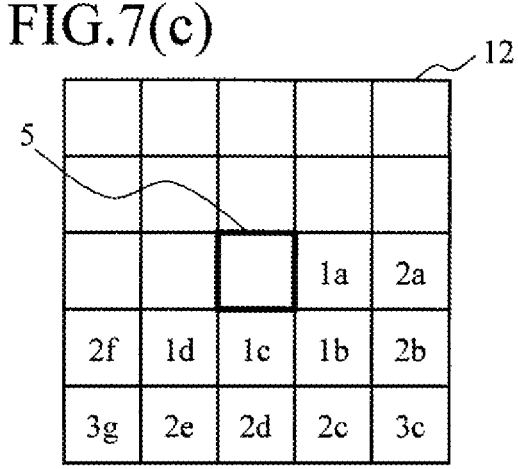

FIG. 7(c) is a drawing for explaining acquiring of the co-occurrence in the medium-resolution image 12.

The image processing device 8 sets the pixel of interest 5 with respect to the medium-resolution image 12, acquires the co-occurrence of gradient directions with the pixel of interest 5 from the pixel of interest 5 for the offset pixels 1a to 1d (i.e., adjacent of the pixel of interest 5) at the offset distance 1, and gives a vote for the co-occurrence matrix 15 for each combination.

Similarly, the co-occurrence is taken for the offset pixels 2a to 2f at the offset distance 2, an offset pixel group at the offset distance 3, and an offset pixel group (not illustrate) still more far therefrom, and a vote is given for each co-occurrence matrix 15.

The image processing device 8 executes the above-mentioned processing for all pixels, moving the pixel of interest 5 in the medium-resolution image 12.

Although not illustrated, the image processing device 8 acquires co-occurrence in the gradient directions for all pixels similarly for the low-resolution image 13, moving the pixel of interest 5, and votes for the co-occurrence matrix 15.

It is to be noted that the most far offset distance corresponds to four pixels in the high-resolution image 11 and the medium-resolution image 12, and corresponds to three pixels in the low-resolution image 13. A different value for each resolution can be set and the optimum value can be set from balance with the accuracy of the image recognition.

In this manner, the pixel combination acquiring means included in the image processing device 8 according this modified example is configured to acquire the combination of the pixels having the same resolution for each resolution.

Figure 7D:

The image processing device 8 executes the above-mentioned processing for all the block regions 3 of the original image 2, arranges in a line by connecting the component of the element of the obtained co-occurrence matrix 15, and creates the co-occurrence histogram 18 shown in FIG. 7(d).

Then, the image processing device 8 normalizes this, generates the co-occurrence feature amount vector, and makes this the co-occurrence feature amount of the image.

FIG. 8 are drawings for explaining a second modified example.

The image processing device 8 of this modified example acquires the co-occurrence feature amount from the co-occurrence in the gradient directions in the high-resolution image 11 (original image 2), without executing a conversion of the resolution.

Figure 8A:
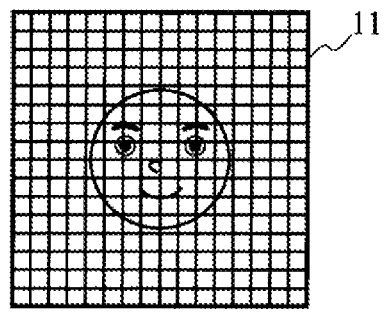
FIG. 8 are drawings for explaining a second modified example.
Figure 8B:
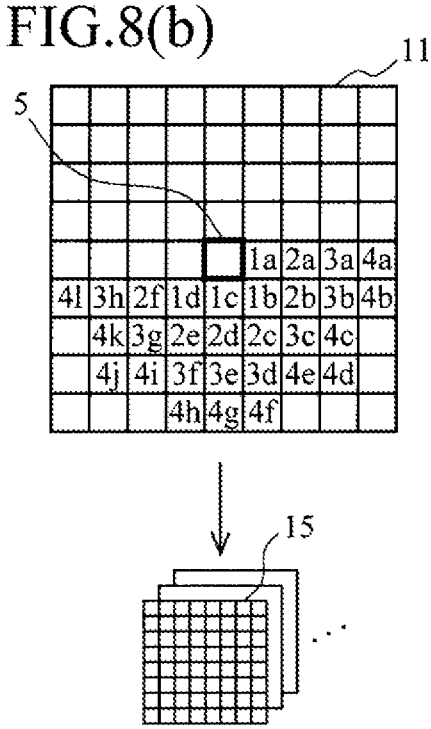

As shown in FIG. 8(a), the image processing device 8 takes the co-occurrence in the gradient directions between the pixel of interest 5 and offset pixels 1a to 4l at the offset distances 1 to 4 from the pixel of interest 5 with respect to the high-resolution image 11 obtained from the block region 3A (refer to FIG. 1(a)), as shown in FIG. 8(b), and gives a vote for the co-occurrence matrix 15 for every combination of the pixel of interest 5 and the offset pixels as the explained embodiment.

Then, the image processing device 8 executes similar processing for all the pixels of the high-resolution image 11, moving the pixel of interest 5 to the adjacent pixel rightward toward the drawing.

Figure 8C:
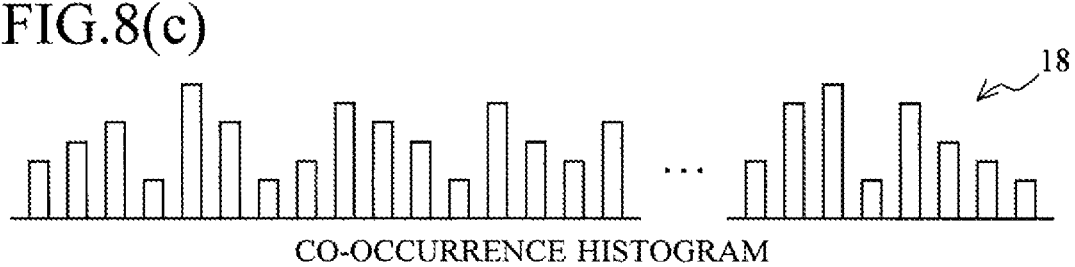

Then, when the image processing device 8 completes the co-occurrence matrix 15 for all the block regions 3, the image processing device 8 generates the co-occurrence histogram 18 by connecting the histogram formed from this shown in FIG. 8(c), and normalizes this as the co-occurrence feature amount.

FIG. 9 are drawings for explaining a third modified example.

In this modified example, gradient directions are made into the continuous values from 0 degree to 360 degrees, and the co-occurrence feature amount is extracted using Gaussian Mixture Model (GMM).

The images taking the co-occurrence is the high-resolution image 11, the medium-resolution image 12, and the low-resolution image 13 which are shown in FIG. 1(b) of the embodiment, and it takes the co-occurrence in the gradient directions with the pixel of interest 5 and the offset pixels 1a to 3d which are set as the high-resolution image 11 in a similar manner to the embodiment.

It is to be noted that this is merely an example, it may be co-occurrence in each resolution of multiple resolutions shown in the first modified example, and may be co-occurrence in the high-resolution image 11 shown in the second modified example.

Thus, in a similar manner to the embodiment, the image processing device 8 sets the pixel of interest 5 to the high-resolution image 11, and takes the co-occurrence in the gradient directions between the pixel of interest 5 and the offset pixels 1a to 1d, 2a to 2d, and 3a to 3d.

Although the vote is given for the co-occurrence matrix 15 in the embodiment, this modified example plots as a co-occurrence corresponding point 51 to the feature plane 50 in which the axis of abscissa is the gradient directions of the pixel of interest 5 and the axis of ordinate is the gradient directions of the offset pixel. The feature plane 50 is a scatter diagram shown in FIG. 9(a).

Moreover, the image processing device 8 creates the feature plane 50 for each position of the pixel of interest and the offset pixel in a similar manner to the co-occurrence matrix 15.

The co-occurrence corresponding points 51, 51, . . . plotted on the feature plane 50 have a tendency to get together in accordance with the feature of the image, and the image processing device 8 clusters them into K clusters 60a, 60b, and 60c. The clustering is processing for grouping the points close in distance into a group.

K is a value previously set and typically corresponds to integers, e.g. K=64, but it is set to K=3 in the example of the drawing for simplification.

After the image processing device 8 clusters the co-occurrence corresponding point 51, a group state of distribution of the co-occurrence corresponding point 51 in the feature plane 50 is expressed by the probability density function p $(x|\theta)$ in accordance with the GMM 53 linearly overlapping K Gaussian distributions as shown in FIG. 9(b). x is a vector quantity expressing the distribution of the co-occurrence corresponding point 51, and $\theta$ is a vector quantity expressing the parameter.

More specifically, p $(x|\theta)$ is expressed by the equation shown in FIG. 9(c). K is a number of mixtures, corresponds to the number of the Gaussian distribution overlapped in the GMM 53, and is 3 in the above-mentioned example.

z is a potential variable used for calculating an EM algorithm and contribution percentage, and z1, z2, . . . , zK are used in correspondence with the K Gaussian distributions to be mixed.

Although explanation is omitted, the EM algorithm is an algorithm for estimating the parameter ($\mu_j$, $\Sigma_j$) for maximizing likelihood.

$\pi_j$ is called a mixture coefficient and indicates a probability for selecting the j-th Gaussian distribution.

The image processing device 8 calculates a reference GMM 55 shown in FIG. 9(d) by learning many learning images showing the recognizing object, in accordance with the above-mentioned function. In the drawing the reference GMM 55 is schematically represented by a two dimensional plane for the sake of clarity. The reference GMM 55 is an amount including the feature amount of the recognizing object.

After preparing the reference GMM 55 in this manner, the image processing device 8 extracts the feature amount of the recognizing object image with the load ratio (contribution percentage) γ with respect to the reference GMM 55.

As expressed by the equation of FIG. 9(e), γ(zkn) is a posterior probability of the potential variable z when the distribution of the co-occurrence corresponding point 51 of the recognizing object image is given to the reference GMM 55, and k-th Gaussian distribution indicates a degree of explaining observation of xn.

The image recognition of the image processing device 8 is performed using the feature amounts.

According to the embodiment and the modified examples described above, the following effects can be obtained.

(1) The more robust feature amount than the HOG feature amount can be extracted from images by co-occurrence in the gradient directions, without using the HOG feature amount.
(2) The co-occurrence feature amount obtains by taking the co-occurrence over a plurality of the resolutions or in the gradient directions in the respective resolutions.
(3) By executing the image recognition of the moving image frame in real time, the object which moves can be tracked with the moving image.
(4) Since it is suitable for mounting by semiconductor devices, dedicated chips can be developed and supplied in large quantities at low cost.
(5) By mounting a dedicated chip, downsizing and cost reduction can be realized, and, it can be spread in mobile terminals such as in-vehicle devices and portable terminals such as smartphones, for example.

EXPLANATION OF LETTERS OR NUMERALS

2 Original image
3 Block region
5 Pixel of interest
8 Image processing device
11 High-resolution image
12 Medium-resolution image
13 Low-resolution image
15 Co-occurrence matrix
18 Co-occurrence histogram
19 Reference feature amount vector
20, 21, 22 Co-occurrence feature amount vector
31, 32 Curve
50 Feature plane
51 Co-occurrence corresponding point
53 GMM
55 Reference GMM
60 Cluster
81 CPU
82 ROM
83 RAM
84 Storage device
85 Storage medium driving device
86 Input unit
87 Output unit
101 image
102 cell
106 Histogram
107 HOG feature amount

The invention claimed is:
1. An image feature amount output device comprising a processor programmed to:
receive an input of an image;
convert a resolution of the input image;
acquire luminance gradient directions of pixels included in the input image and the image obtained by converting the resolution;
acquire a combination of two pixels from the pixels included in the input image and the image obtained by converting the resolution;
acquire a co-occurrence in the acquired luminance gradient direction with respect to the two pixels related to the acquired combination, using the acquired luminance gradient direction of each pixel;
acquire distribution of an occurrence frequency of the acquired co-occurrence and change the acquired combination of the two pixels; and output a feature amount of the image as the acquired distribution of the occurrence frequency of the acquired co-occurrence, which does not include an output of the acquired luminance gradient direction.

2. The image feature amount output device according to claim 1, wherein the processor is programmed to acquire at least a combination of adjacent pixels over the whole image.

3. The image feature amount output device according to claim 1, wherein the processor is programmed to acquire a combination of pixels having different resolutions.

4. The image feature amount output device according to claim 2, wherein the processor is programmed to acquire the combination of pixels having different resolutions.

5. The image feature amount output device according to claim 1, wherein the processor is programmed to acquire a combination of pixels having a same resolution for each resolution.

6. The image feature amount output device according to claim 2, wherein the processor is programmed to acquire the combination of pixels having a same resolution for each resolution.

7. An image recognition device comprising a processor programmed to:
   acquire a reference feature amount expressing a feature amount of a recognizing object with distribution of an occurrence frequency of co-occurrence in a luminance gradient direction;
   acquire an object image which is an object to be determined;
   input the acquired object image into the image feature amount output device according to claim 1, and acquire the feature amount of the aforementioned object image;
   determine whether the object image includes a recognizing object image by comparing the acquired reference feature amount and the acquired feature amount of the object image; and
   output a result of the determination.

8. A non-transitory computer-readable storage medium storing an image feature amount output program that, when executed by a processor, performs functions comprising:
   an image input function inputting an image;
   a resolution conversion function converting a resolution of the input image;
   a gradient direction acquiring function acquiring a luminance gradient directions of pixels included in the input image and the image obtained by converting the resolution;
   a pixel combination acquiring function acquiring a combination of two pixels from the pixels included in the input image and the image obtained by converting the resolution;
   a co-occurrence acquiring function acquiring a co-occurrence in the luminance gradient direction acquired by the gradient direction acquiring function with respect to the two pixels related to the acquired combination, using the acquired luminance gradient direction of each pixel;
   an occurrence frequency acquiring function acquiring distribution of an occurrence frequency of the co-occurrence acquired by the co-occurrence acquiring function and changing the combination of the pixel to be acquired in the pixel combination acquiring function; and
   an output function outputting a feature amount of the image as the distribution of the occurrence frequency of the co-occurrence acquired by the occurrence frequency acquiring function, which does not include outputting of the acquired luminance gradient direction.

9. A non-transitory computer-readable storage medium storing an image recognition program that, when executed by the processor, performs functions comprising:
   a reference feature amount acquiring function acquiring a reference feature amount expressing a feature amount of a recognizing object with distribution of an occurrence frequency of co-occurrence in a luminance gradient direction;
   an object image acquiring function acquiring an object image which is an object to be determined;
   an object image feature amount acquiring function inputting the acquired object image into the image input means of the image feature amount output device according to claim 1, and acquiring a feature amount of the object image;
   a determination function determining whether the object image includes a recognizing object image by comparing the acquired reference feature amount and the acquired feature amount of the object image; and
   a result outputting function outputting a result of the determination.

10. A non-transitory computer-readable storage medium storing an image recognition program that, when executed by the processor, performs functions comprising:
   a reference feature amount acquiring function acquiring a reference feature amount expressing a feature amount of a recognizing object with distribution of an occurrence frequency of co-occurrence in a luminance gradient direction;
   an object image acquiring function acquiring an object image which is an object to be determined;
   an object image feature amount acquiring function inputting the acquired object image into the image input function of the image feature amount output program according to claim 8, and acquiring a feature amount of the object image;
   a determination function for determining whether the object image includes a recognizing object image by comparing the acquired reference feature amount and the acquired feature amount of the object image; and
   a result outputting function outputting a result of the determination.

* * * * *